United States Patent
Mathur et al.

(10) Patent No.: US 7,406,470 B2
(45) Date of Patent: *Jul. 29, 2008

(54) FULL REGULAR EXPRESSION SEARCH OF NETWORK TRAFFIC

(75) Inventors: Alok Mathur, Milpitas, CA (US); Boris Beylin, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 258 days.

This patent is subject to a terminal disclaimer.

(21) Appl. No.: 11/206,388

(22) Filed: Aug. 17, 2005

(65) Prior Publication Data

US 2005/0289165 A1    Dec. 29, 2005

Related U.S. Application Data

(63) Continuation of application No. 10/172,486, filed on Jun. 13, 2002, now Pat. No. 6,952,694.

(51) Int. Cl.
*G06F 17/30* (2006.01)
(52) U.S. Cl. .......................................... 707/6; 707/100
(58) Field of Classification Search ................. 707/2–6, 707/100; 709/231
See application file for complete search history.

(56) References Cited

U.S. PATENT DOCUMENTS

| | | | |
|---|---|---|---|
| 4,241,402 A | 12/1980 | Mayper et al. | |
| 5,317,509 A * | 5/1994 | Caldwell | 704/9 |
| 5,369,577 A | 11/1994 | Kadashevich et al. | |
| 5,671,416 A | 9/1997 | Elson | |
| 5,995,963 A * | 11/1999 | Nanba et al. | 707/6 |
| 6,018,735 A | 1/2000 | Hunter | |
| 6,493,713 B1 * | 12/2002 | Kanno | 707/6 |
| 6,671,856 B1 * | 12/2003 | Gillam | 715/210 |

OTHER PUBLICATIONS

U.S. Appl. No. 09/361,347, titled "String Search Scheme in a Distributed Architecture" filed on Jul. 26, 1999 inventor Boris Beylin. Application Pending.

* cited by examiner

*Primary Examiner*—Cheryl Lewis
(74) *Attorney, Agent, or Firm*—Blakely, Sokoloff, Taylor & Zafman LLP

(57) ABSTRACT

An embodiment of a system, method and apparatus is disclosed. The system comprises a first processor that is in communication with a root existence table. The first processor is to check the root existence table to determine if a character is a root character. A second processor is in communication with a root active list. The second processor is to retrieve an entry that corresponds to the character and to associate a pointer with the entry. A third processor is in communication with the second processor and a tree structure. The third processor is to receive the pointer from the second processor and to maintain the tree and table structure.

20 Claims, 7 Drawing Sheets

| ENTRY | EXISTENCE LIST POINTER | EXISTENCE COUNT |
|---|---|---|
| ... | ... | 0 |
| G [0x47] | 5 | 1 |
| ... | ... | 0 |

ROOT EXISTENCE TABLE 110

FIG. 4

Tree & Table Structure [TTS] 140

| ENTRY 600 | CHILD LIST POINTER 610 | CHILD COUNT 620 | SECONDARY CHILD LIST POINTER 630 | SECONDARY CHILD COUNT 640 | VALID BIT 650 | UNIQUE BIT 660 | TERMINAL BIT 670 | VIRTUAL BIT 680 | QUALIFIER 690 |
|---|---|---|---|---|---|---|---|---|---|
| ... | ... | ... | ... | ... | ... | ... | ... | ... | ... |
| 7 | 13 | 1 | 0 | 0 | 1 | 1 | 0 | 0 | Bit 0x47 Set (G) |
| ... | ... | ... | ... | ... | ... | ... | ... | ... | ... |
| 13 | 16 | 1 | 0 | 0 | 1 | 1 | 0 | 0 | Bit 0x65 Set (e) |
| ... | ... | ... | ... | ... | ... | ... | ... | ... | ... |
| 16 | 0 | 0 | 27 | 1 | 1 | 1 | 0 | 0 | Bit 0x74 Set (t) |
| 27 | 35 | 2 | 0 | 0 | 1 | 0 | 0 | 0 | All bits except 0x0a [\n] Set [.] |
| ... | ... | ... | ... | ... | ... | ... | ... | ... | ... |
| 35 | 0 | 0 | 0 | 0 | 1 | 1 | 1 | 0 | Bit 0x41 Set (A) |
| 36 | 0 | 0 | 0 | 0 | 1 | 1 | 1 | 0 | Bit 0x42 Set (B) |
| ... | ... | ... | ... | ... | ... | ... | ... | ... | ... |

FIG. 6

FULL REGULAR EXPRESSION SEARCH OF NETWORK TRAFFIC

RELATED APPLICATION

This application is a continuation application of U.S. application Ser. No. 10/172,486, U.S. Pat. No. 6,952,694, filed on Jun. 13, 2002, and priority is claimed thereof.

FIELD

Embodiments of the invention relate to identification of predetermined patterns in digital data and, more particularly, to a scheme for identifying a string of data using a multi-stage searching technique performed by multiple hardware components.

BACKGROUND

In order to expand networks to provide more information and services to more people and to a greater number of places, networks have become easier to use and more reliable. However, making the network operate smoothly requires a high degree of interoperability, scalability and platform independence. One aspect of network management is policy enforcement. Policy enforcement provides a way to give some types of traffic, such as real-time video, priority over other, less important traffic, such as e-mail.

Policy enforcement has been provided with general purpose computers, fixed-function appliances, and/or switches and routers. General purpose computers that provide policy enforcement typically include two or more network interface cards (NICs) that provide multiple connections to the network. Policy enforcement is provided by the processor of the general purpose computer. However, general purpose computers are not developed to perform high-speed operations on network packets. Because of this policy enforcement with general purpose computers is a bottleneck to network performance.

In an attempt to overcome the performance limitations of using general purpose computers for policy enforcement, fixed-function devices specifically designed to support policy enforcement have been developed. Typically, these fixed-function appliances have a processor and/or customized hardware and two or more NICs. While fixed-function appliances can be fast enough for some network operations, scalability is restricted.

Switches and routers have been used to provide policy enforcement. However, switches and routers typically do not have sufficient processing power to provide policy enforcement in addition to switching and routing functionality. The processors of the switches and routers must be used for both policy enforcement and for switching and/or routing functionality, which decreases network performance. Alternatively, switches and routers can be designed with more powerful processors, which increases the cost of the switches and routers.

DESCRIPTION OF THE DRAWINGS

The invention may best be understood by referring to the following description and accompanying drawings that are used to illustrate embodiments of the invention. In the drawings:

FIG. 4 illustrates an embodiment of a root existence table;

FIG. 6 illustrates an embodiment of a tree table structure; and

DETAILED DESCRIPTION

Methods and apparatuses for regular expression searching are described. In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
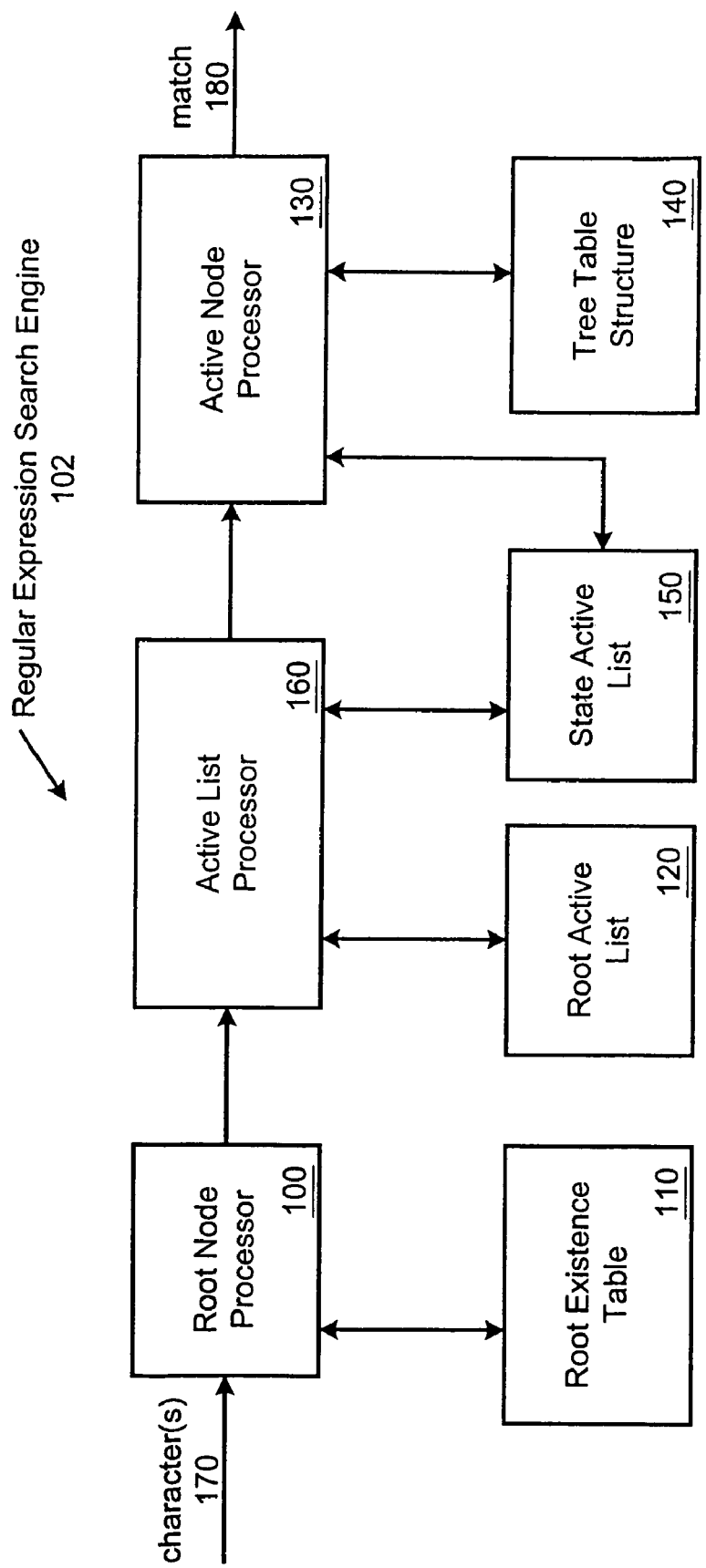
FIG. 1 illustrates an embodiment of a regular expression search engine.

FIG. 1 illustrates an embodiment of a regular expression search engine 102. In one embodiment, the search engine 102 is implemented as hardware, for example, as an application specific integrated circuit (ASIC) or as a programmable logic array (PLA). In alternate embodiments, the search engine can be implemented as a combination of hardware and software.

Incoming characters 170 are processed by root node processor 100, which checks each incoming character to determine whether the character is a potential root character of a string of interest. As used herein a "string of interest" is a string of characters being searched for within a string of data. The data can be, for example, network packet, files, or any type of data. In general, when root node processor 100 identifies a character that is a potential root node, root node processor activates a finite state automaton (FSA) to identify whether or not the incoming data matches a particular string of interest.

In one embodiment, every character is checked to determine whether the character is a "^" character or a "\W" character. The "^" character indicates the beginning of a string or, if qualified by a "\n" character or a "\r" character, indicates the beginning of a line. The "\W" character indicates a non-alphanumeric character.

In one embodiment, a regular expression matches a string if any of the alternatives of the regular expression match. Alternatives are separated by the "|" character (i.e., the "vertical bar" character), and are evaluated left-to-right, stopping on the first complete match. An alternative matches if every item in the alternative matches in the order the items occur.

In one embodiment, an item includes an assertion and/or a quantified atom. Assertions are:

"^" matches the beginning of the string (or line, if "$*" set).

"$" matches the end of the string (or line if "$*" set).

"\b" matches on word boundary (between "\w" and "\W").

"\B" matches on non-word boundary.

In one embodiment, a quantified atom includes one of the following followed by a quantifier that indicates the number of times the atom must or may occur. If there is no quantifier, the atom must occur only once.

"{n,m}" must occur at least n times but no more than m times.
"{n,}" must occur at least n times.
"{n}" must match exactly n times.
"*" must occur 0 or more times (same as "{0,}").
"+" must occur 1 or more times (same as "{1,}").
"?" must occur 0 or 1 time (same as "{0,1}").

Acceptable atoms include the following. A regular expression in parentheses matches whatever the regular expression matches. A "." matches any character except "\n". A list of characters in square brackets ("[ ]") matches one of a class of characters. A caret ("^") at the beginning of the list negates the class. Character ranges may be indicated using "a-z" notation.

In one embodiment, a "backslash" character matches a special character or character class.

"\b" indicates a backspace character class.
"\-" indicates a hyphen character.
"\n" indicates a newline character.
"\r" indicates a carriage return.
"\t" indicates a tab.
"\f" indicates a form feed.
"\d" indicates a digit (same as "[0-9]").
"\D" indicates a non-digit.
"\w" indicates a word character (same as "[0-9a-z_A-Z]").
"\W" indicates a non-word character.
"\s" indicates a whitespace character.
"\S" indicates a non-whitespace character.

Additional and/or different string definitions can also be used to define a regular expression search. In general, a regular expression search is a flexible search definition that allows for a search of a large number of potential strings.

In one embodiment, for each character, an existence list is maintained in root existence table 110. The character is used as an index to one of 256 entries in root existence table 110. In one embodiment, the entries of root existence table 110 includes an existence list pointer (ELP) that is used to indicate information related to an active root. One embodiment of a root existence table is described in greater detail below with respect to FIG. 4.

The ELP is returned to root node processor 100 for use in further processing. In one embodiment, an ELP value of zero indicates that the corresponding character is not a valid root. In one embodiment, the root node processor 100 passes the ELP to an active list processor (ALP) 160. The active list processor 160 maintains a root active list (RAL) 120 and a state active list (SAL) 150. The state active list 150 maintains a list of all the active nodes. The root active list 120 is a list maintained for handling root characters. In one embodiment, the entries of the root active list 120 include a node pointer (NP) that points to a node corresponding to the next character in the string of interest. One embodiment of a root active list is described in greater detail below with respect to FIG. 5. The ELP points to an entry in the root active list 120. The active list processor 160 retrieves the entry pointed to by the ELP for further processing.

In one embodiment, the active list processor 160 passes the NP corresponding to the retrieved entry to an active node processor (ANP) 130 for further processing. In one embodiment, the active node processor 130 maintains a tree table structure 140. Each entry in the tree table structure 140 corresponds to a character in the string of interest. One embodiment of a tree table structure is described in greater detail below in respect to FIG. 6.

The NP points to an entry in the tree table structure (TTS) 140. The active node processor 130 retrieves the entry pointed to by the NP for further processing. In one embodiment, after an entry is fetched from the tree table structure 140, the entry is compared to the current character in the data stream. If there is no match, the corresponding FSA may be aborted. If there is a match, the node is inserted into the state active list 150. The active list processor 160 retrieves entries corresponding to the nodes in the state active list 150 when the next character in the data stream is fetched. When a string of characters 170 in a data stream match a string of interest being searched for, the match 180 may be reported by the active node processor 130.

Figure 2:
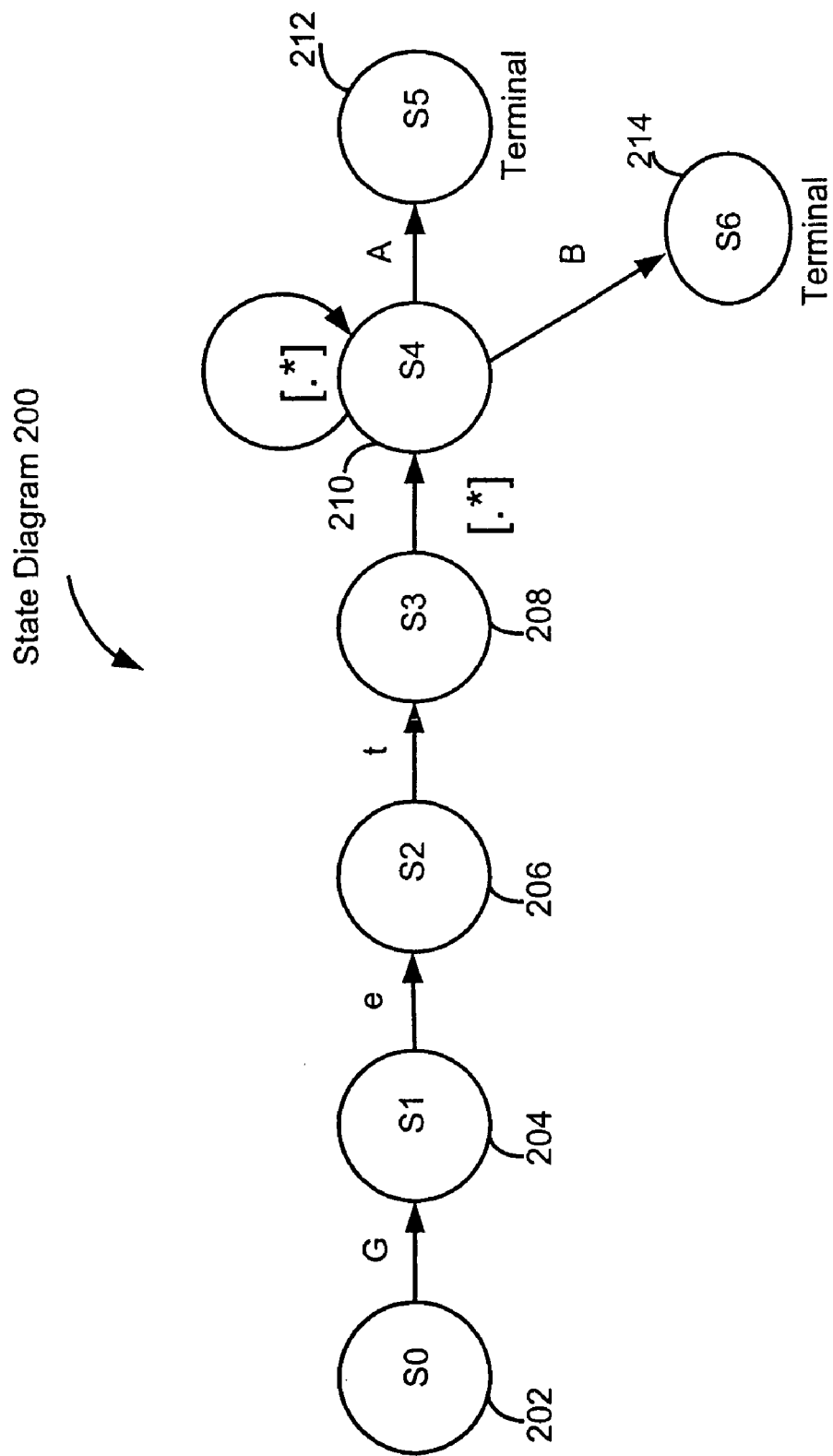
FIG. 2 illustrates an exemplary state diagram of one embodiment of a finite state automation.

FIG. 2 illustrates an exemplary state diagram of one embodiment of a finite state automaton (FSA). In one embodiment, the strings (or patterns) searched for are specified as a collection of one or more regular expressions; however, other definitions can also be used. In the example illustrated in FIG. 2, the following strings are searched for:

Get .* A
Get .* B where "." indicates any value except a new line and "*" indicates a general wildcard. Other expression indicators can also be used.

In this example, the FSA begins at state S0 at 202. If a root character of a data stream matches the root character, "G", of the FSA, then the FSA is activated. The FSA moves to state S1 at 204. The next character in the data stream is compared to the next character, "e", of the string of interest. At any time there is no match, the FSA is aborted. If there is a match, the FSA moves to state S2 at 206. Then, the next character in the data stream is compared to the next character, "t", of the string of interest. If there is a match, the FSA moves to state S3 at 208. Then, the next character in the data stream is compared to ".*". If there is a match, the FSA moves to state S4 at 210. Since ".*" may consume more than one character, the FSA may stay at state S4 until a character in the data stream does not match ".*" or matches one of the next characters in the strings of interest, "A" or "B". If a character in the data stream matches "A", then the FSA moves to state S5 at 212. S5 is a terminal state, indicating that A is the last character in a string of interest, and characters in the data stream have matched the string "Get .*A". If a character in the data stream matches "B", then the FSA moves to state S6 at 214. S6 is a terminal state, indicating that B is the last character in a string of interest, and characters in the data stream have matched the string "Get .*B". Once a terminal state has been reached, the result of a match may be reported. In one embodiment, the active node processor 130 generates a report indicating any matched strings of interest.

Figure 3:
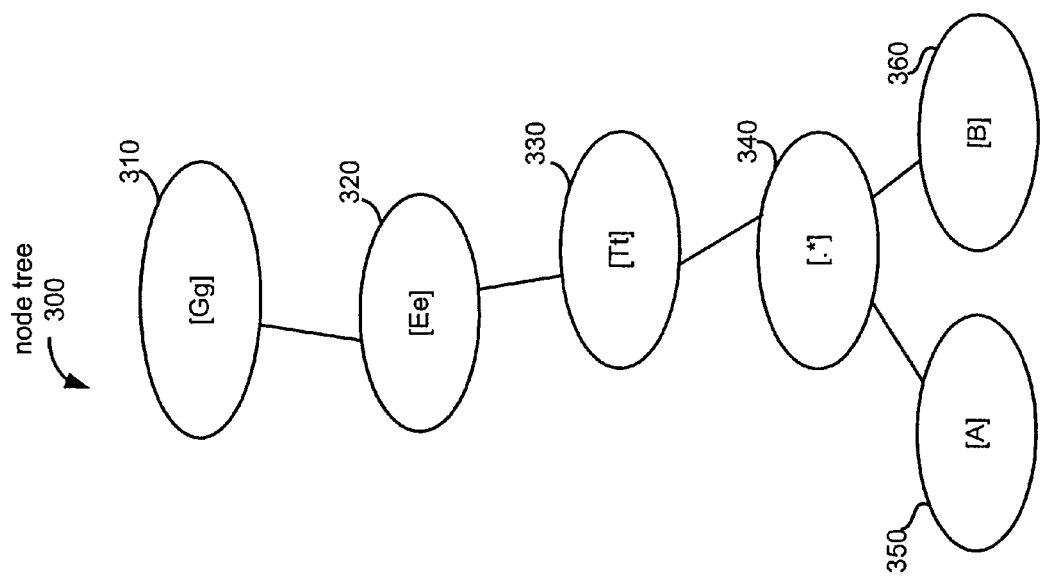
FIG. 3 illustrates an embodiment of a node tree.

FIG. 3 illustrates an embodiment of a node tree 300. The root node 310 indicates the potential root characters of a string of interest. The root node 310 has one or more children. There are two types of children: primary and secondary. Primary children can consume only one character in a string, such as "[Gg]" or "[pqrt]". Secondary children can consume zero or more characters in a string, such as "[ab]*" or ".*". The root node 310 has one primary child, node 320. Node 320 has one primary child, node 330. Node 330 has one secondary child, node 340. Node 340 has two primary children, nodes 350 and 360.

FIG. 4 illustrates an embodiment of a root existence table 110. In this embodiment, root existence table 110 contains three fields: the entry 400, existence list pointer 410 (ELP), and existence count (EC) 420. The entry 400 corresponds to a root character in a string of interest. The ELP 410 points to a corresponding entry in the root active list 120 that contains more information about the root node. The EC 420 indicates the number of children the root node has. Additional and/or different fields can also be included in root existence table 110.

Figure 5:
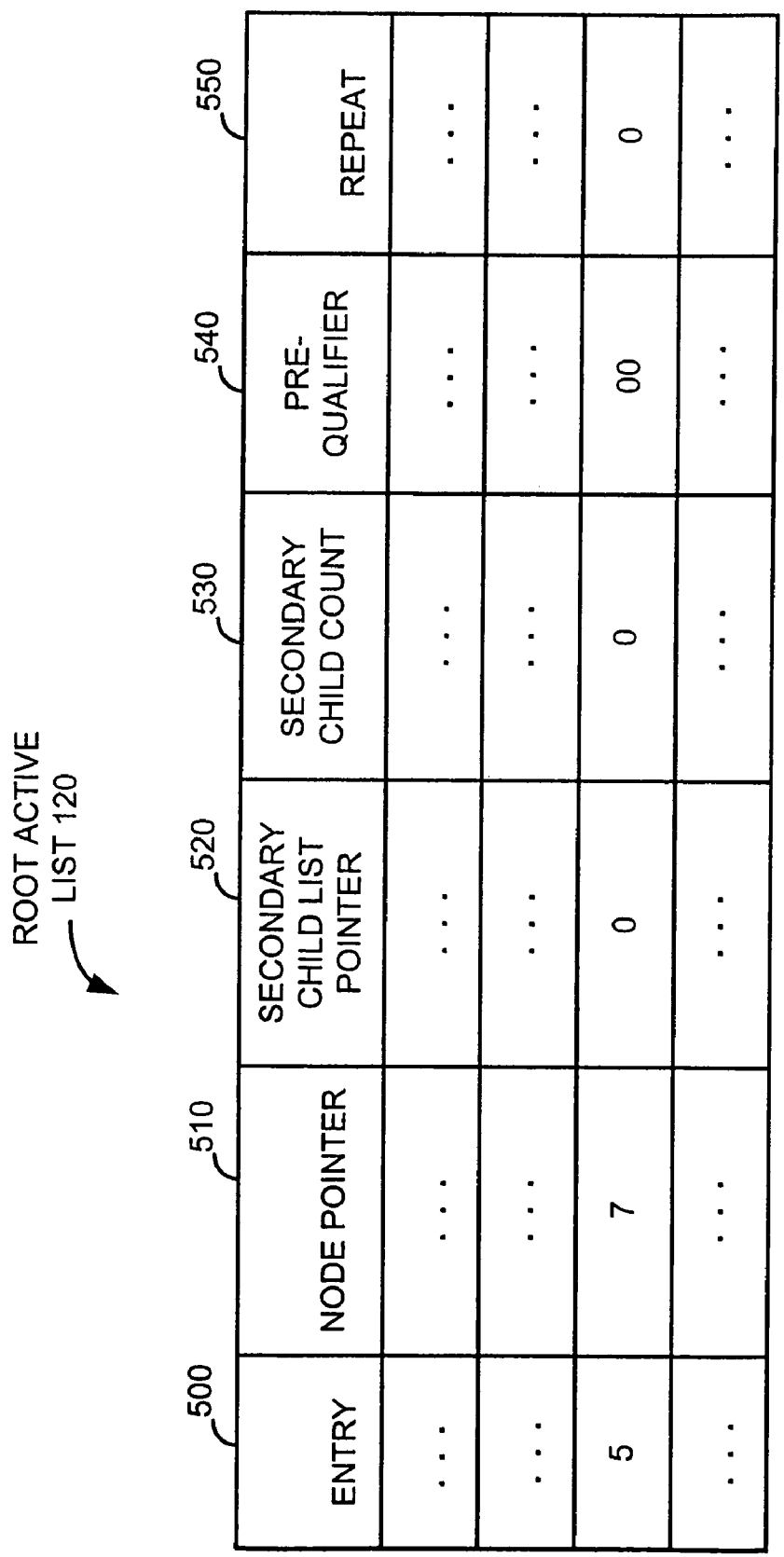
FIG. 5 illustrates an embodiment of a root active list.

FIG. 5 illustrates an embodiment of a root active list 120. Root active list 120 contains additional information about the root nodes. In this embodiment, root active list 120 contains six fields: the entry 500, node pointer (NP) 510, secondary child list pointer (SCLP) 520, secondary child count (SCC) 530, pre-qualifier (PQ) 540, and repeat bit (R) 550. The entry 500 indicates the number assigned to the root node. The NP 510 points to an entry in tree table structure 140 that corresponds to a primary child of the root node. The SCLP 520 points to an entry in the tree table structure 140 that corresponds to a secondary child of the root node. The SCC 530 indicates how many secondary children the root node has. The pre-qualifier 540 indicates any conditions before qualifying the node. The repeat bit 550 indicates if more than one character can be consumed by the root node. Additional and/or different fields can also be included in root active list 120.

FIG. 6 illustrates an embodiment of a tree table structure 140. In this embodiment, the tree table structure 140 contains seven fields: the entry 600, child list pointer (CLP) 610, child count (CC) 620, secondary child list pointer (SCLP) 630, secondary child count (SCC) 640, valid bit (VA) 650, unique bit (U) 660, terminal bit (T) 670, virtual bit (VI) 680, and qualifier (Q) 690. Additional and/or different fields can also be included in tree table structure 140. The entry 600 indicates the number assigned to the node. The CLP 610 points to an entry in tree table structure 140 that corresponds to a primary child of the node. The CC 620 indicates how many primary children the node has. The SCLP 630 points to an entry in tree table structure 140 that corresponds to a secondary child of the node. The SCC 640 indicates how many secondary children the node has.

The valid bit 650 indicates whether the node is valid. The valid bit is used to support dynamic deletion of nodes in the tree. If a node is deleted, the node is no longer valid. The unique bit 660 indicates whether the node is unique. If a node is unique and qualifies, then other children of the parent do not have to be explored. The terminal bit 670 indicates whether the node is terminal. A node is terminal if the node is the end of a string or pattern of interest. The virtual bit 680 indicates that the node is a virtual node and does not consume a character. The qualifier 690 is a 256-bit vector that indicates which characters will qualify the node. If a character in the data stream qualifies a node, indicating a match between the character in the data stream and a corresponding character in a string of interest, the corresponding FSA will move to the next state, and the next child node will be retrieved from the table tree structure 140 and compared to the next character in the data stream.

An illustrative example of a string search will now be described. For purposes of illustration, assume that the followings strings or patterns are being searched for:

[Gg] [Ee] [Tt].* A
[Gg] [Ee] [Tt].* B
[Dd] [Bb] [Cc].* XYZ
[Pp] [Oo] [Ss] [Tt].* A B C where "." indicates any value except a new line, "*" indicates a general wildcard, and "[Gg]" indicates both uppercase and lowercase "g". Assume that the root existence table 110, the root active list 120, and the tree table structure 140 contain entries as shown in FIGS. 4, 5, and 6 respectively. In this example, a data stream containing a data string "GetXYAB" is to be examined to determine if there is a match with any of the strings being searched for.

The root character "G" is retrieved from the data string "GetXYAB". The root node processor 100 checks the root existence table 110 to determine whether "G" is a root character being searched for. Since there is at least one string with a root character of "G" being searched for, there is an entry in the root existence table 110 that corresponds to "G". Therefore, the root existence table 110 returns the existence list pointer 410 to the root node processor 100. The root node processor 100 passes the existence list pointer 410 to the active list processor 160. The existence list pointer 410 points to an entry in the root active list 120 containing information about the root node that corresponds to the root character "G". As shown in FIG. 4, the existence list pointer 410 for entry "G" points to entry 5 in the root active list 120. Therefore, the active list processor 160 accesses the root active list 120 and retrieves entry 5. As shown in FIG. 5, the node pointer 510 corresponding to entry 5 points to entry 7 in the tree table structure 140. The active list processor 160 passes the node pointer 510 to the active node processor 130. At this point, the processing of the root character "G" is done.

The next character "e" is retrieved from the data string "GetXYAB". The root node processor 100 checks the root existence table 110 to determine whether "e" is a root character being searched for. Since none of the strings being searched for have a root character of "e", the root existence table 110 returns a "0" to root node processor 100, indicating that no entry corresponding to a root character of "e" exists in the table. Next, the active node processor 130 uses the node pointer 510 to determine which entry to look up in the tree table structure 140. The node pointer 510 points to entry 7. Therefore, the active node processor 130 retrieves entry 7 from the tree table structure 140. The child list pointer 610 of entry 7 points to entry 13 in the tree table structure 140, indicating that node 13 is a child of node 7. Therefore, the active node processor 130 retrieves entry 13 from the tree table structure 140. The character "e" is compared to the qualifier of entry 13. There is a match, so node 13 is inserted into the state active list 150. At this point, the processing of the character "e" is done.

The next character "t" is retrieved from the data string "GetXYAB". The root node processor 100 checks the root existence table 110 to determine whether "t" is a root character being searched for. Since none of the strings being searched for have a root character of "t", the root existence table 110 returns a "0" to root node processor 100, indicating that no entry corresponding to a root character of "t" exists in the table. Next, the active list processor 160 retrieves the first entry from the state active list 150, which corresponds to node 13. The active list processor 160 passes this information to active node processor 130. Active node processor 130 retrieves entry 13 from the tree table structure 140. The child list pointer 610 of entry 13 points to entry 16 in the tree table structure 140, indicating that node 16 is a child of node 13. Therefore, the active node processor 130 retrieves entry 16 from the tree table structure 140. The character "t" is compared to the qualifier of entry 16. There is a match, so node 16 is inserted into the state active list 150. At this point, the processing of the character "t" is done.

The next character "X" is retrieved from the data string "GetXYAB". The root node processor 100 checks the root existence table 110 to determine whether "X" is a root character being searched for. Since none of the strings being searched for have a root character of "X", the root existence table 110 returns a "0" to root node processor 100, indicating that no entry corresponding to a root character of "X" exists in the table. Next, the active list processor 160 retrieves the first entry from the state active list 150, which corresponds to node 16. The active list processor 160 passes this information to active node processor 130. Active node processor 130 retrieves entry 16 from the tree table structure 140. The child list pointer 610 and child count 620 are 0, indicating that node 16 has no primary children. However, the secondary child count 640 is 1, indicating that node 16 has one secondary child. The secondary child list pointer 630 points to entry 27, indicating that node 27 is a secondary child of node 16. Therefore, the active node processor 130 retrieves entry 27 from the tree table structure 140. The character "X" is compared to the qualifier of entry 27. There is a match, so node 27 is inserted into the state active list 150 with the repeat bit set, indicating that node 27 may consume more than one character. The child count of entry 27 is two, indicating that node 27 has two children: nodes 35 and 36. Therefore, the active node processor 130 retrieves entries 35 and 36 from the tree table structure 140. The character "X" is compared to the qualifier of entry 35. There is no match. The character "X" is compared to the qualifier of entry 36. There is no match. At this point, the processing of the character "X" is done.

The next character "Y" is retrieved from the data string "GetXYAB". The root node processor 100 checks the root existence table 110 to determine whether "Y" is a root character being searched for. Since none of the strings being searched for have a root character of "Y", the root existence table 110 returns a "0" to root node processor 100, indicating that no entry corresponding to a root character of "Y" exists in the table. Next, the active list processor 160 retrieves the first entry from the state active list 150, which corresponds to node 27. The active list processor 160 passes this information to active node processor 130. Active node processor 130 retrieves entry 27 from the tree table structure 140. The character "Y" is compared to the qualifier of entry 27. There is a match, so node 27 is re-inserted into the state active list 150 with the repeat bit set, indicating that node 27 may consume more than one character. The child count of entry 27 is two, indicating that node 27 has two children: nodes 35 and 36. Therefore, the active node processor 130 retrieves entries 35 and 36 from the tree table structure 140. The character "Y" is compared to the qualifier of entry 35. There is no match. The character "Y" is compared to the qualifier of entry 36. There is no match. At this point, the processing of the character "Y" is done.

The next character "A" is retrieved from the data string "GetXYAB". The root node processor 100 checks the root existence table 110 to determine whether "A" is a root character being searched for. Since none of the strings being searched for have a root character of "A", the root existence table 110 returns a "0" to root node processor 100, indicating that no entry corresponding to a root character of "A" exists in the table. Next, the active list processor 160 retrieves the first entry from the state active list 150, which corresponds to node 27. The active list processor 160 passes this information to active node processor 130. Active node processor 130 retrieves entry 27 from the tree table structure 140. The character "A" is compared to the qualifier of entry 27. There is a match, so node 27 is re-inserted into the state active list 150 with the repeat bit set, indicating that node 27 may consume more than one character. The child count of entry 27 is two, indicating that node 27 has two children: nodes 35 and 36. Therefore, the active node processor 130 retrieves entries 35 and 36 from the tree table structure 140. The character "A" is compared to the qualifier of entry 35. There is a match. Since the terminal bit of entry 35 is 1, indicating that one of the strings to be searched for terminates with character "A", a string to be searched for has been found, and this result may be reported. Since the unique bit of entry 35 is 1, indicating that the node is unique, no other children of entry 27 need to be explored. Therefore, the processing of the character "A" is done.

The next character "B" is retrieved from the data string "GetXYAB". The root node processor 100 checks the root existence table 110 to determine whether "B" is a root character being searched for. Since none of the strings being searched for have a root character of "B", the root existence table 110 returns a "0" to root node processor 100, indicating that no entry corresponding to a root character of "B" exists in the table. Next, the active list processor 160 retrieves the first entry from the state active list 150, which corresponds to node 27. The active list processor 160 passes this information to active node processor 130. Active node processor 130 retrieves entry 27 from the tree table structure 140. The character "B" is compared to the qualifier of entry 27. There is a match, so node 27 is re-inserted into the state active list 150 with the repeat bit set, indicating that node 27 may consume more than one character. The child count of entry 27 is two, indicating that node 27 has two children: nodes 35 and 36. Therefore, the active node processor 130 retrieves entries 35 and 36 from the tree table structure 140. The character "B" is compared to the qualifier of entry 35. There is no match. The character "B" is compared to the qualifier of entry 36. There is a match. Since the terminal bit of entry 36 is 1, indicating that one of the strings to be searched for terminates with character "B", a string to be searched for has been found, and this result may be reported. Since the unique bit of entry 36 is 1, indicating that the node is unique, no other children of entry 27 need to be explored. Therefore, the processing of the character "B" is done. The end result is that the data stream containing "GetXYAB" matches two of the strings being searched for: "Get.*A" and "Get.*B". The result of these matches may be reported by one of the processors.

Figure 7:
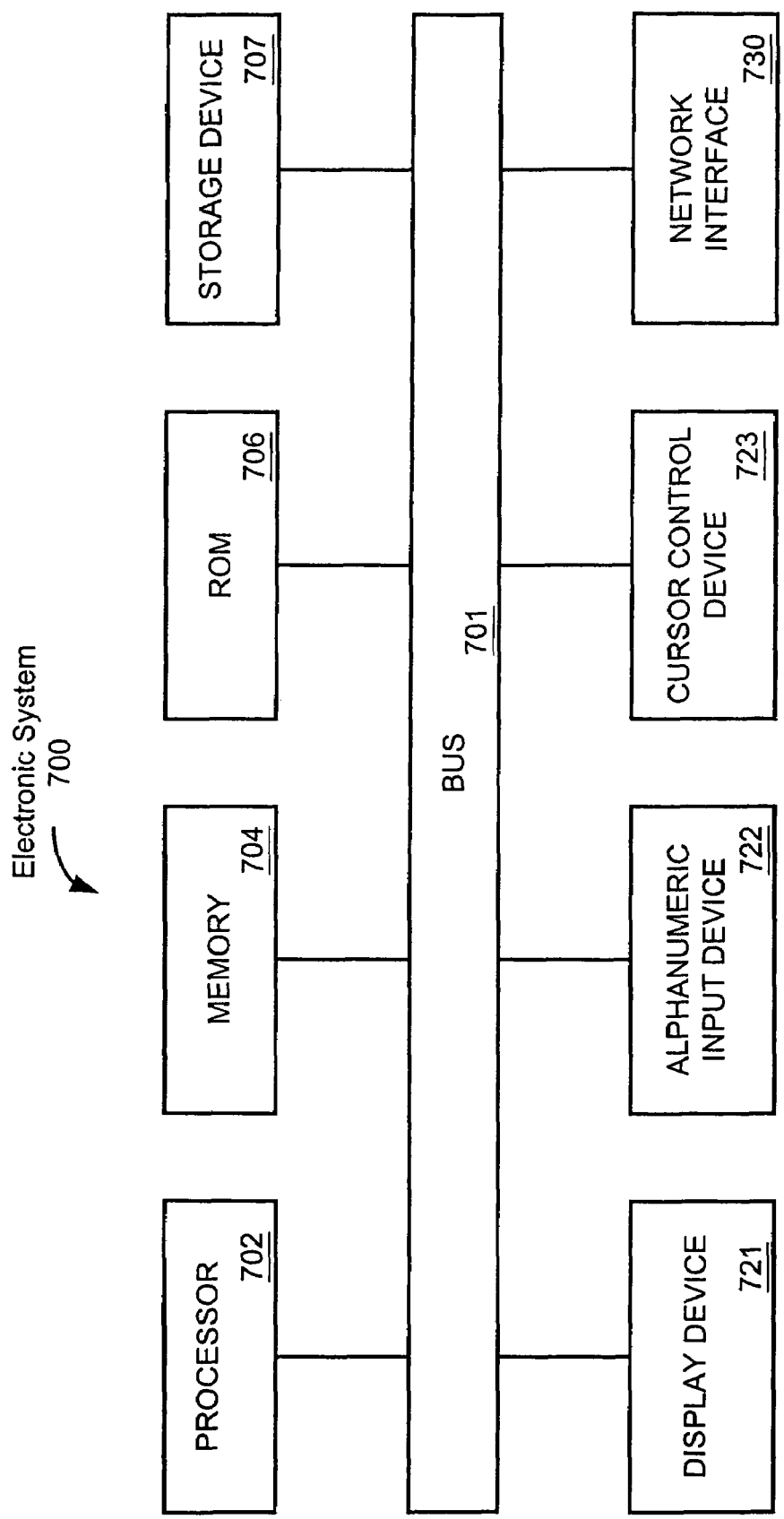
FIG. 7 illustrates an embodiment of an electronic system.

In one embodiment, portions of the regular expression search can be implemented as sequences of instructions executed by an electronic system. The sequences of instructions can be stored by the electronic device or the instructions can be received by the electronic device (e.g., via a network connection). FIG. 7 illustrates an embodiment of an electronic system. The electronic system illustrated in FIG. 7 is intended to represent a range of electronic systems, for example, computer systems, network access devices, etc. Alternative electronic systems can include more, fewer and/or different components.

Electronic system 700 includes bus 701 or other communication device to communicate information, and processor 702 coupled to bus 701 to process information. While electronic system 700 is illustrated with a single processor, electronic system 700 can include multiple processors and/or co-processors. Electronic system 700 further includes random access memory (RAM) or other dynamic storage device 704 (referred to as memory), coupled to bus 701 to store information and instructions to be executed by processor 702. Memory 704 also can be used to store temporary variables or other intermediate information during execution of instructions by processor 702.

Electronic system 700 also includes read only memory (ROM) and/or other static storage device 706 coupled to bus 701 to store static information and instructions for processor 702. Data storage device 707 is coupled to bus 701 to store information and instructions. Data storage device 707 such as a magnetic disk or optical disc and corresponding drive can be coupled to electronic system 700.

Electronic system 700 can also be coupled via bus 701 to display device 721, such as a cathode ray tube (CRT) or liquid crystal display (LCD), to display information to a computer user. Alphanumeric input device 722, including alphanumeric and other keys, is typically coupled to bus 701 to communicate information and command selections to processor 702. Another type of user input device is cursor control 723, such as a mouse, a trackball, or cursor direction keys to communicate direction information and command selections to processor 702 and to control cursor movement on display 721. Electronic system 700 further includes network interface 730 to provide access to a network, such as a local area network.

Instructions are provided to memory from a storage device, such as magnetic disk, a read-only memory (ROM) integrated circuit, CD-ROM, DVD, via a remote connection (e.g., over a network via network interface 730) that is either wired or wireless providing access to one or more electronically-accessible media, etc. In alternative embodiments, hard-wired circuitry can be used in place of or in combination with software instructions. Thus, execution of sequences of instructions is not limited to any specific combination of hardware circuitry and software instructions.

An electronically-accessible medium includes any mechanism that provides (i.e., stores and/or transmits) content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals); etc.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A system comprising:
a first processor in communication with a root existence table, the first processor to check the root existence table to determine if a string of characters includes a root character;
a second processor coupled with the first processor, the second processor in communication with a root active list, the second processor to retrieve an entry corresponding to the root character, and associate a pointer with the entry; and
a third processor coupled with the first and second processors, the third processor in communication with the second processor and a tree structure, the third processor to receive the pointer from the second processor, and maintain the tree structure, wherein the tree structure represents the string of characters, the string of characters having a data stream character that is compared with a root node of the free structure, activate a state machine if the data stream character matches the root node of the tree structure, and compare subsequent data stream characters to subsequent nodes of the tree structure.

2. The system of claim 1, wherein the character comprises one of a string of characters.

3. The system of claim 1, further comprising a state machine to compare subsequent characters in the string of characters with nodes in the tree structure.

4. The system of claim 1, wherein the first processor comprises a root node processor.

5. The system of claim 1, wherein the second processor comprises an active list processor.

6. The system of claim 1, wherein the third processor comprises an active node processor.

7. The system of claim 1, the pointer comprises a node pointer.

8. The system of claim 1, wherein the nodes in the tree structure include one or more of the entry, a child list pointer, a child count, a secondary child list pointer, a secondary child count, a bit, and a qualifier.

9. A method comprising:
checking a root existence table to determine if a string of characters includes a root character;
retrieving an entry corresponding to the root character;
associating a pointer with the entry;
receiving the pointer from a processor; and
maintaining a tree structure, wherein the tree structure represents the string of characters, the string of characters having a data stream character that is compared with a root node of the tree structure, activating a state machine if the data stream character matches the root node of the tree structure, and comparing subsequent data stream characters to subsequent nodes of the tree structure.

10. The method of claim 9, wherein the character comprises one of a string of characters.

11. The method of claim 9, further comprising comparing subsequent characters in the string of characters with nodes in the tree structure.

12. The method of claim 9, further comprising returning an existence list pointer from the root existence table.

13. The method of claim 12, further comprising passing the existence list pointer to the processor.

14. The method of claim 9, wherein the pointer comprises a node pointer.

15. A machine-readable storage medium comprising instructions which, when executed, cause a machine to:
check a root existence table to determine if a string of characters includes a root character;
retrieve an entry corresponding to the root character;
associate a pointer with the entry;
receive the pointer from a processor; and
maintain a tree structure, wherein the tree structure represents the string of characters, the string of characters having a data stream character that is compared with a root node of the tree structure, activate a state machine if the data stream character matches the root node of the tree structure, and compare subsequent data stream characters to subsequent nodes of the tree structure.

16. The machine-readable storage medium of claim 15, wherein the character comprises one of a string of characters.

17. The machine-readable storage medium of claim 15, wherein the sets of instructions, when executed by the machine, further cause the machine to compare subsequent characters in the string of characters with nodes in the tree structure.

18. The machine-readable storage medium of claim 15, wherein the sets of instructions, when executed by the machine, further cause the machine to return an existence list pointer from the root existence table.

19. The machine-readable storage of claim 18, wherein the sets of instructions, when executed by the machine, further cause the machine to pass the existence list pointer to the processor.

20. The machine-readable storage medium of claim 15, wherein the pointer comprises a node pointer.

* * * * *